United States Patent [19]
Comroe et al.

[11] Patent Number: 5,054,110
[45] Date of Patent: Oct. 1, 1991

[54] MULTI-SITE DISPATCHING SYSTEM CELL REGISTRATION

[75] Inventors: Richard A. Comroe, Dundee; Arun Sobti, Wheaton; John E. Major, Barrington, all of Ill.

[73] Assignee: Motorola, Inc., Schaumburg, Ill.

[21] Appl. No.: 459,024

[22] Filed: Dec. 29, 1989

[51] Int. Cl.[5] .................. H04Q 7/00; H04M 11/00
[52] U.S. Cl. ..................................... 455/33; 455/54; 379/59
[58] Field of Search .............. 455/33, 34, 54, 56; 379/59, 60, 63

[56] References Cited

U.S. PATENT DOCUMENTS 4,737,978  4/1988  Burke et al. ................... 455/33

FOREIGN PATENT DOCUMENTS 2165127  4/1986  United Kingdom ............... 455/54

Primary Examiner—Curtis Kuntz
Assistant Examiner—Christine K. Belzer
Attorney, Agent, or Firm—Jon P. Christensen

[57] ABSTRACT

A trunked communication system wherein less than all of the communication units may transmit an identifying data word thereby registering their location to a system controller every time they enter a different coverage area, while the remainder of the communication units do not. The identity of the communication units which operate in each mode is known to the system resource controller in advance. Pre-registration allows the system controller to know the locale of target units in advance when communications to those units is requested. The locale of units that do no pre-register their location are identified through system wide paging. Coordinating the identification of locales of units in both modes permits greater optimization of spectral resources.

4 Claims, 1 Drawing Sheet

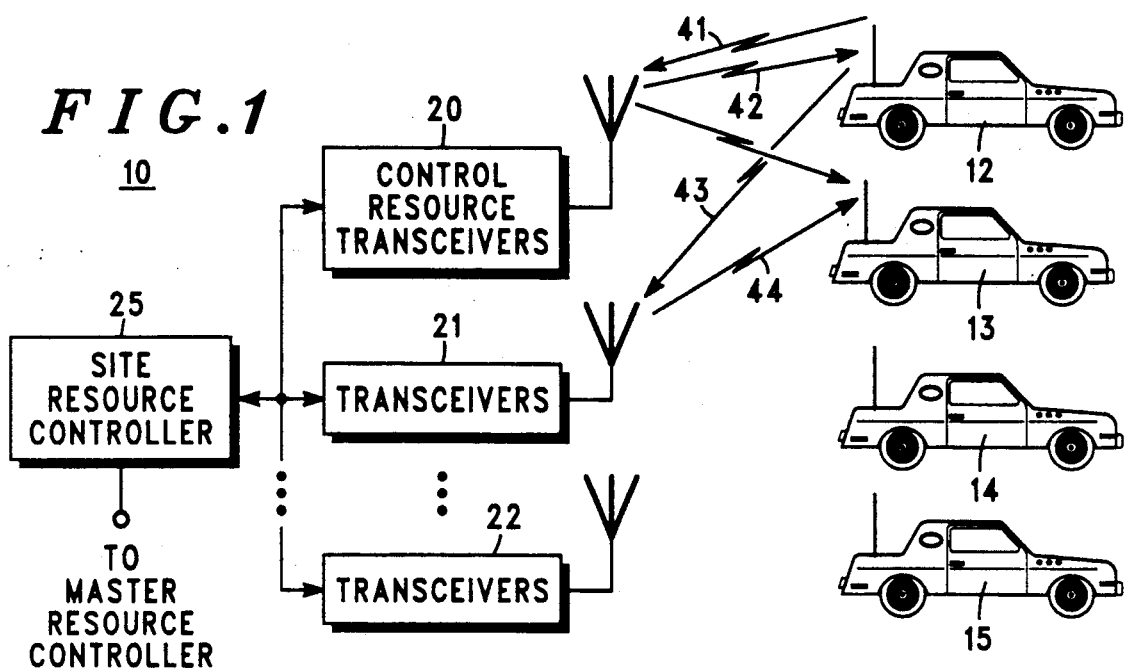
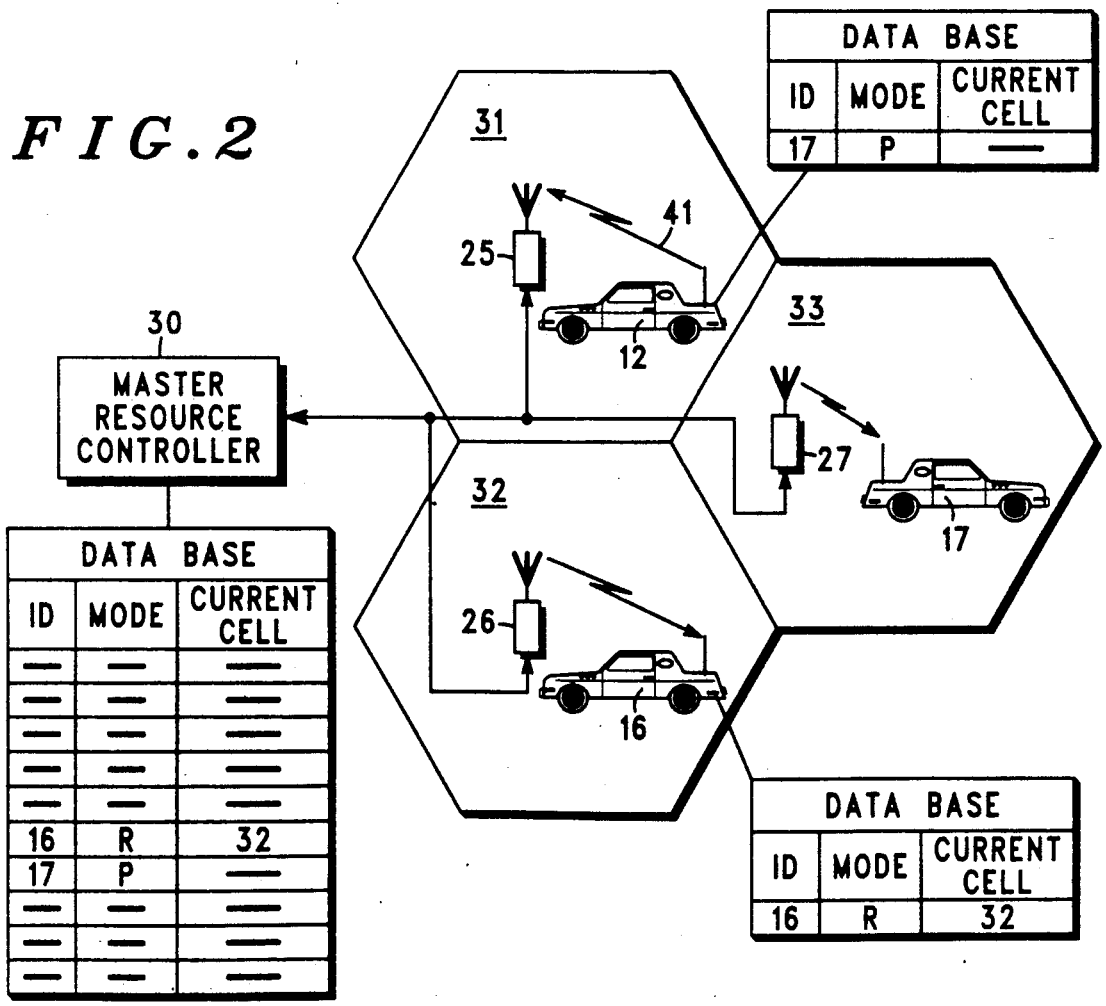

MULTI-SITE DISPATCHING SYSTEM CELL REGISTRATION

TECHNICAL FIELD

This invention relates generally to the field of communication systems and more specifically to trunked systems.

BACKGROUND OF THE INVENTION

Dispatch communication systems using transmission trunking are known. Such systems typically use frequency pairs (i.e., a transmit frequency and a receive frequency) that are assigned by a resource controller for transmitting and receiving messages. The resource controller assigns the frequency pair upon receiving a request for service from a communications unit. Upon receiving the assignment data the requesting unit and all target units tune to the appropriate frequencies and two-way communication can then occur.

While most dispatch communications systems utilize a single site, some utilize multiple sites, or cells to cover a larger geographic area. As is known in the art, if less than all of the target communication units are located in the same cell as the requestor then the system controller must identify the locales of the remaining target units. The locales are normally identified thorough the use of one of two known methods: system wide paging, or cell registration.

In system wide paging the locale of a target unit is determined by transmitting a page to the target unit over a resource controller in every cell within the system. The locale of the target is then determined from a response by the target to the resource controller in the cell within which the target unit is located.

In cell registration a communication unit transmits its identity to the resource controller within a cell whenever the communication unit passes into the coverage area of the cell, as in the case where a communication unit moves through a geographic area covered by multiple cells.

In the past, dispatch communication systems have worked well because systems tended to have few (or only one) large cells and competition for spectral space was minimal. However, cells have decreased in size through the passage of time (increased in number) as a result of increased competition for spectral resources. As such, system wide paging is often not appropriate for all users as it is wasteful of spectral resources in systems with many cells as in the case of communications users that use the system frequently, i.e., that utilize the communications systems much more often than they change cell locations. Also, the system wide page increases the time required to access targets, as the paging process requires significant time to locate target units.

Likewise, systems which employ cell registration may also be wasteful of spectral resources as in the case where the communication unit changes cell location more frequently than the communication unit utilizes the communications system or when a communication unit is primarily a call initiator and seldom is a call target. Accordingly, a need exists for a methodology for finding target communication units that is less wasteful of time and spectrum.

SUMMARY OF THE INVENTION

Pursuant to one embodiment of this invention, each communication unit contains at least three data elements. The first data element contains the ID number of the communication unit. The first data element is necessary to establish to the communication system that the communication unit is part of a subscriber group of communication units within the communication system.

The second data element identifies the communication unit as operating under one of two possible operating protocols. The two possible operating protocols are system wide page or cell registration. The second element establishes not only how the communication unit will interact with the communication system but also how the communication system will interact with the communication unit.

The third data element may contain an ID number of the cell within which the communication unit is then operating. The third data element may be obtained through the process of cell registration by the communication unit programmed to operate under the protocol of cell registration and may be not used for a unit programmed to operate under the protocol of system wide page.

Likewise, a master resource controller contains a data base with a substantially matching set of data elements for each communication unit served. The first data element identifies the communication unit as a subscriber within the system. The second element contains the operating mode of the communication unit. The third element may contain the then current location of the communication unit. The third data element of a communication unit programmed to operate under cell registration will be updated periodically within the data base whenever the communication unit enters the coverage area of a different cell and, again, may not be used for a communication unit operating under the protocol of system wide page.

Whenever a communication unit enters a coverage area of a different cell it will act according to the protocol contained within the second data element previously programmed within the unit. When the second data element specifies cell registration then the communication unit upon entry into a different cell will immediately register its presence within the cell. The master resource controller may then update the new locale into the third data element for the communication unit within the data base.

Likewise, when a communication unit initiates a dispatch call, the master resource controller consults the data base for the operating protocol of all target communication units. The locales of those target units listed as operating under the cell registration protocol will be pre-registered within the data base and system wide paging will not be required. System wide paging is only necessary for those target units listed in the data base as operating under the protocol of system wide paging.

In summary, this invention permits both methods of locating target communication units to be employed within the same system. As such, it permits the best utilization of spectral resources because the most appropriate operating protocol may be utilized for each communication unit.

BRIEF DESCRIPTION OF THE DRAWINGS

FIG. 1 comprises a block diagram showing one cell of a dispatch trunked system in accordance with the invention.

FIG. 2. comprises a block diagram of a dispatch trunked system showing a requestor in one cell in contact with a receiver in two other cells.

BEST MODE FOR CARRYING OUT THE INVENTION

Referring now to FIG. 1, a trunked dispatch radio communication system can be seen as depicted generally by the numeral 10. The system (10) generally includes a plurality of communication units (12 through 15) (as used herein, "communication units" refers to mobile units, portable units, or fixed location units), transceivers that can transmit or receive (21 through 22) and a site resource controller (25). The system also includes a control resource transceiver (20) to allow transmission and reception of system control information.

By design all of the communication units (12 through 15) have been constructed to monitor the control frequency of the resource controller of the cell within which the communication unit is located as well understood in the art. If the signal on the control frequency from the base site should not be present and the communication unit (12 through 15) should detect a control frequency nearby in another cell then the communication unit will automatically transmit a data word to the stronger resource controller identifying its presence within the other cell.

In general, to establish a dispatch call between a group of communication units operating on such a system (10), a requesting communication unit (12) sends a data packet called an ISW (41) (inbound signalling word) on the inbound frequency allocated to the receive control resource (20). The ISW (41) typically contains the requesting communication unit's unique ID code (consisting of a fleet ID and an individual ID, plus a subfleet code indicating that group of units which the requesting communication unit wishes to talk to). The site resource controller (25) decodes the request, and transmits on the transmit control resource (20) an appropriate frequency grant OSW (42) (outbound signalling word) to the requesting communication unit (12). The requesting unit's (12) frequency grant OSW (42) causes it to move to the designated transmit frequency for transmission.

Within a trunked system (10) consisting of only a single site, all receiving units are within the same site coverage area, or cell. The resource controller then transmits an appropriate frequency grant OSW (42) to all target communication units (13 through 15) that are monitoring the outbound control frequency. The OSW (42) to the target units causes the target units (13 through 15) to move to the designated receive frequency for reception. It is the function of the resource controller to also route the signals received on the assigned transmit resource receiver to the assigned receive resource transmitter. In this way, a group or subfleet voice message may be transmitted from the requesting unit to appropriate target units.

Within a trunked system which includes more than one cell (FIG. 2) additional procedures are necessary. The additional procedures are based on the potential that at least one of the intended receiving units may be located within a different cell than the requesting unit. In one embodiment, upon receipt of the ISW (41) by the site resource controller (25) from a requesting communication unit (12), the site resource controller (25) (the requesting cell) transmits a target ID (or IDs, as the case may be) to a master resource controller (30). Upon receipt of the target ID, the master resource controller (30) then searches a data-base to locate the data entries for the target unit (16).

The data-base in the master resource controller (30) contains three data elements for each communications unit served. The first data element is used to identify the communication unit and to locate, within the data base, the operating parameters of the communication unit. The second data element identifies the communications unit as operating under one of two possible operating protocols, which will be known as system wide page (denoted as P), & cell registration (denoted as R). The third data element holds the ID of the cell in which the communications unit has last registered its presence which data element and ID is present for all communications units operating under the cell registration protocol.

Likewise, each communication unit contains three data elements. The first data element is the ID number for the communication unit. The second data element (the data element which identifies system wide page or cell registration as an operating mode) matches the corresponding data element in the master resource controller's data base for the communications unit.

Whenever a communication unit enters a different cell it acts according to a protocol determined by the contents of the second data element. If the operating mode is cell registration then the communications unit monitors a control resource of the base site within which the communication unit is then located to determine the ID number of the base site. If the ID number of the base site is different than the base site ID number stored within the communication unit then the communication unit transmits a data word to the resource controller identifying the unit's presence within the cell. The resource controller responds with an acknowledgement confirming the unit's registration. The resource controller may then update the appropriate third data element within the master resource controller data base with the new locale of the communications unit. The communication unit may then also update an internal data base. In the figure, target communications unit (16) is listed in the master resource controller's data base as utilizing the cell registration method, denoted as R. It has also registered its presence in the cell (32).

As mentioned, the communication unit updates the internal data base whenever cell registration occurs. In this way the communications unit may decern when it is activated from a powered-off state whether the cell it finds itself in is the same cell it was previously located in before deactivation or in a different cell. Thus the communications unit (16) contains data elements indicating that the unit utilizes the cell registration method, denoted as R, and that it has last registered its presence in the cell denoted as 32.

Returning now to the call which was initiated (FIG. 2), the master resource controller checks the operating mode of the target unit (16) within the data base. Since the target unit (16) is listed as operating in cell registration mode, it then extracts the identity of the cell (32) within which the target has most recently registered.

Upon identifying the location of the targets the master resource controller (30) then transmits to the target cell (32) and to the requesting cell (31) over a control resource the identification of a voice-path resource between the target cell (32) and the requesting cell (31) and the ID number of the target unit associated with the use of the voice-path resource. Thus it is the function of the master site controller to allocate and to connect voice circuits between transmit and receive resources within different sites in a similar functionality of the site resource controller previously described.

The site resource controller (25) within the requesting cell (31) upon receipt of the voice-path allocation and the ID number of the target communication unit decodes the request from the master resource controller (30) and transmits an appropriate transmit frequency grant OSW to the communication unit (12) monitoring the outbound control frequency of the site resource controller (25). Upon receipt of the OSW from the site resource controller (25) the communication unit (12) moves to the appropriate transmit frequency. The site resource controller (26) within the target cell (32) upon receipt of the voice-path allocation and target ID number decodes the request and transmits an appropriate receive frequency grant OSW to the target communication units (16) monitoring the outbound control frequency of the site resource controller (26). Upon receipt of the OSW from the site resource controller (26) the communications unit (16) moves to the designated receive frequency thereby completing the connection.

In a second example (FIG. 2), the requesting unit (12) transmits a request for communication with two receiving units (16 and 17). The process follows a process identical to the previous example up to the point where the master resource controller consults the data base. The data base in this case indicates that one of the two target communications units (17) operates in the system wide page mode. The master resource controller must now, in addition, convey to each site within the system a request to transmit a page for the unit (17). The unit (17) responds within its current cell (33), which response is then relayed back to the master resource controller supplying the needed target location to complete the call processing as above.

We claim:

1. A communication system having:
   A) a plurality of communication units;
   B) a plurality of base sites;
   C) a service coverage area for each base site
   D) at least one target mobile communication unit;
   E) a data base; and wherein the plurality of communication units includes at least one communication unit constructed to pre-register within the data base its location by transmitting an identifying data word based upon either one of activation or upon entry into the service coverage area of a base site; and wherein a resource controller allocates communication resources between a requesting communication unit and the target communication unit based upon either one of the location of the target stored in the data base or based upon a location of the target identified through the issuance of a system-wide page;

and wherein each base site includes:
   A) a service coverage area,
   B) a plurality of transceiver resources,
   C) control resource receiver means for receiving a transmitted data word and thereby registering the presence of a communication unit within the coverage area of the base site.

2. The communication system as recited in claim 1, wherein the time to access a target communication unit is reduced when the target communication unit has pre-registered its presence within the communication system.

3. A method of assigning communication resources to communication units in a communication system having:
   A) a plurality of communications resources;
   B) a plurality of base sites;
   C) a service coverage area for each base site;
   E) at least one target communication unit;
   F) a data base;
   the method comprising the steps of:
   A) providing within each base site a control resource receiver means to receive a data word from mobile communication units and thereby to register the presence of the communication units within the coverage area of the cell;
   B) providing a data base to store the locale of potential target communication units;
   C) receiving from a first communication unit, a request to communicate with at least one target communication unit;
   D) searching the data base to identify the locale of the target communication unit;
   E) issuing a system-wide page to identify the locale of a the target communication unit when the target has not preregistered its locale;
   F) providing a communication resource between the first communication unit and the target unit based on the use of the previously stored locational data or the results of the system-wide page.

4. The method as recited in claim 3, wherein the time to access a target communication units is reduced when the target communication unit has pre-registered its presence within the communication system.

* * * * *